US012645882B2

(12) United States Patent
Orbach et al.

(10) Patent No.: US 12,645,882 B2
(45) Date of Patent: Jun. 2, 2026

(54) SYSTEM AND METHOD OF IDENTIFYING A VARIATION OF A PHRASE IN A TEXTUAL PASSAGE

(71) Applicant: Genesys Cloud Services, Inc., Menlo Park, CA (US)

(72) Inventors: Eyal Orbach, Tel-Aviv (IL); Avraham Faizakof, Tel-Aviv (IL); Lev Haikin, Tel-Aviv (IL); Nelly David, Tel-Aviv (IL); Rotem Moaz, Tel-Aviv (IL)

( * ) Notice: Subject to any disclaimer, the term of this patent is extended or adjusted under 35 U.S.C. 154(b) by 301 days.

(21) Appl. No.: 18/378,509

(22) Filed: Oct. 10, 2023

(65) Prior Publication Data

US 2025/0117586 A1     Apr. 10, 2025

(51) Int. Cl.
*G06F 40/30*          (2020.01)
*G06N 5/04*          (2023.01)

(52) U.S. Cl.
CPC .............. *G06F 40/30* (2020.01); *G06N 5/04* (2013.01)

(58) Field of Classification Search
CPC ................................. G06F 40/30; G06N 5/04
See application file for complete search history.

(56) References Cited

U.S. PATENT DOCUMENTS 7,487,094 B1     2/2009   Konig et al.
10,331,676 B2 *  6/2019   Fu ..................... G06F 16/24575

2016/0004766 A1 *  1/2016   Danielyan ............... G06F 40/30
                                                707/723
2021/0133264 A1 *  5/2021   Tiwari .................... H04L 51/02
2022/0222439 A1 *  7/2022   Kush ..................... G06F 16/345
2022/0261545 A1   8/2022   Lauber
2022/0300517 A1 *  9/2022   Baughman .......... G06F 16/2246
2024/0135106 A1 *  4/2024   Hunter ................... G06F 40/30
2025/0094764 A1 *  3/2025   Hudson ................. G06N 3/006

OTHER PUBLICATIONS

P. P. Ghadekar, S. Mohite, O. More, P. Patil, Sayantika and S. Mangrule, "Sentence Meaning Similarity Detector Using FAISS," Aug. 18-19, 2023, 2023 7th International Conference On Computing, Communication, Control And Automation (ICCUBEA), Pune, India, pp. 1-6, (Year: 2023).*
International Search Report and Written Opinion of the International Authority in co-pending PCT application, having application No. PCT/US2024/043377, mailed on Dec. 4, 2024.
(Continued)

*Primary Examiner* — Eric Yen

(57)            ABSTRACT

A system and method of identifying occurrence of a semantic variation of a phrase in a passage by at least one processor may include calculating a phrase embedding vector, representing a semantic meaning of the phrase; extracting, from a textual representation of the passage, at least one hierarchical set of nested sequences of words; for each sequence, calculating a corresponding sequence embedding vector, representing a semantic meaning of the sequence; for one or more sequence embedding vectors, calculating a corresponding vector similarity value, representing similarity of the sequence embedding vectors to the phrase embedding vector; identifying a sequence corresponding to a maximal vector similarity value of the one or more vector similarity values; and determining the identified sequence as a semantic variation of the phrase, based on the maximal vector similarity value.

20 Claims, 5 Drawing Sheets

S1005 BASED ON A TEXTUAL REPRESENTATION OF THE PHRASE, CALCULATING A PHRASE EMBEDDING VECTOR, REPRESENTING A SEMANTIC MEANING OF THE PHRASE.

S1010 OBTAINING A TEXTUAL REPRESENTATION OF THE PASSAGE, COMPRISING A PLURALITY OF WORDS.

S1015 EXTRACTING, FROM THE TEXTUAL REPRESENTATION OF THE PASSAGE, AT LEAST ONE HIERARCHICAL SET OF NESTED SEQUENCES OF WORDS, WHEREIN EACH SEQUENCE OF A HIERARCHICAL SET FORMS A SUBSET OF WORDS OF A SUBSEQUENT SEQUENCE IN THE HIERARCHICAL SET.

S1020 FOR EACH SEQUENCE, CALCULATING A CORRESPONDING SEQUENCE EMBEDDING VECTOR, REPRESENTING A SEMANTIC MEANING OF THE SEQUENCE.

S1025 FOR ONE OR MORE SEQUENCE EMBEDDING VECTORS, CALCULATING A CORRESPONDING VECTOR SIMILARITY VALUE, REPRESENTING SIMILARITY WITH THE PHRASE EMBEDDING VECTOR.

S1030 IDENTIFYING A SEQUENCE CORRESPONDING TO A MAXIMAL VECTOR SIMILARITY VALUE OF THE ONE OR MORE VECTOR SIMILARITY VALUES.

S1035 DETERMINING THE IDENTIFIED SEQUENCE AS A SEMANTIC VARIATION OF THE PHRASE, BASED ON THE MAXIMAL VECTOR SIMILARITY VALUE.

(56)        References Cited

OTHER PUBLICATIONS

Robertson, S., & Zaragoza, H. (2009). The Probabilistic Relevance
Framework: BM25 and Beyond. NOW Publishers, Inc. ISBN
978-1-60198-308-4.
Reimers, N.A. (2019). Sentence-BERT: Sentence Embeddings Using
Siamese BERT-Networks. Proceedings of the 2019 Conference on
Empirical Methods in Natural Language Processing. Association for
Computational Linguistics.
Ingersoll, A.B. (2012). Apache Lucene 4. In OSIR@SIGIR.
Wu, Y.A. (2016). Google's Neural Machine Translation System:
Bridging the Gap Between Human and Machine Translation. arXiv
preprint arXiv, 1609.08144.
Pennington, J.A. (2014). Glove: Global Vectors for Word Repre-
sentation. Proceedings of the 2014 Conference on Empirical Meth-
ods in Natural Language Processing (EMNLP), 1532-1543.
Devlin, J.A.-W. (2018). Bert: Pre-Training of Deep Bidirectional
Transformers for Language Understanding. arXiv preprint, 1810.
04805.

* cited by examiner

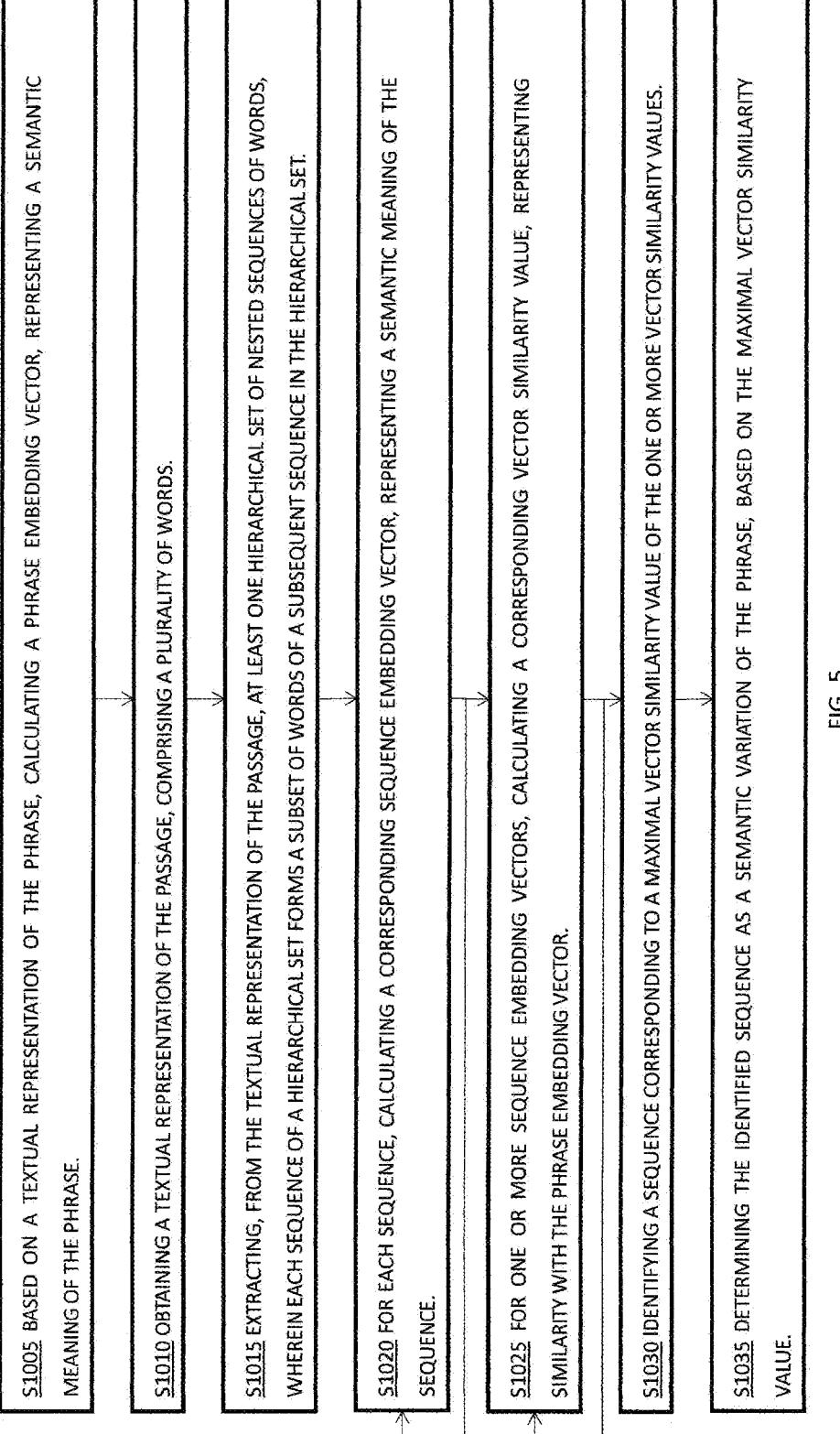

S1005 BASED ON A TEXTUAL REPRESENTATION OF THE PHRASE, CALCULATING A PHRASE EMBEDDING VECTOR, REPRESENTING A SEMANTIC MEANING OF THE PHRASE.

S1010 OBTAINING A TEXTUAL REPRESENTATION OF THE PASSAGE, COMPRISING A PLURALITY OF WORDS.

S1015 EXTRACTING, FROM THE TEXTUAL REPRESENTATION OF THE PASSAGE, AT LEAST ONE HIERARCHICAL SET OF NESTED SEQUENCES OF WORDS, WHEREIN EACH SEQUENCE OF A HIERARCHICAL SET FORMS A SUBSET OF WORDS OF A SUBSEQUENT SEQUENCE IN THE HIERARCHICAL SET.

S1020 FOR EACH SEQUENCE, CALCULATING A CORRESPONDING SEQUENCE EMBEDDING VECTOR, REPRESENTING A SEMANTIC MEANING OF THE SEQUENCE.

S1025 FOR ONE OR MORE SEQUENCE EMBEDDING VECTORS, CALCULATING A CORRESPONDING VECTOR SIMILARITY VALUE, REPRESENTING SIMILARITY WITH THE PHRASE EMBEDDING VECTOR.

S1030 IDENTIFYING A SEQUENCE CORRESPONDING TO A MAXIMAL VECTOR SIMILARITY VALUE OF THE ONE OR MORE VECTOR SIMILARITY VALUES.

S1035 DETERMINING THE IDENTIFIED SEQUENCE AS A SEMANTIC VARIATION OF THE PHRASE, BASED ON THE MAXIMAL VECTOR SIMILARITY VALUE.

FIG. 5

SYSTEM AND METHOD OF IDENTIFYING A VARIATION OF A PHRASE IN A TEXTUAL PASSAGE

FIELD OF THE INVENTION

The present invention relates generally to automated text analysis. More specifically, the present invention relates to identifying a variation of a phrase in a textual passage.

BACKGROUND OF THE INVENTION

Contact Center Representatives engage in high quantities of conversations with various clients daily. A Contact center's manager or analyst may wish to analyze these calls to derive insights to improve either the services the company provides or the quality of the contact center itself. In order to empower such analysis processes capabilities, a contact center system can expose certain functionalities to an "administrator" role that may help the analysis process, specifically a useful functionality for this, is to find a subset of all conversations that deal with a specific topic of interest. In order to automatically find what topics are included in a given conversation, one would need to describe how such topics are defined.

A useful approach to defining such topics is as a customizable set of typical phrases that may appear in conversations entailing the topic, where a 'phrase' may be one or more consecutive words. Detecting an exact match of the phrase in the text of conversation is straight-forward, however compiling lists of all possible variations of phrasing is intractable. Therefore, such a system should aim to effectively generalize the identification of variants of semantically similar phrases (e.g., where "get me a manager" should be deemed similar to "transfer me to a supervisor"), without requiring the user to envisage all possible ways to of articulations beforehand.

Currently available search systems commonly rely on lexical matching to identify semantic similarity. Some traditional approaches treat words as similar if they are either the same word or derived from the same lemmatized or stemmed form.

Some approaches may employ various generalization techniques such as applying different weights to different words (e.g., by calculating Term Frequency-Inverse Document Frequency (TF/IDF)), to evaluate the relevance of words within a document relative to a collection of documents (corpus). Such search systems may determine that a span of text constitutes an occurrence of a searched phrase if enough significant words common to the examined text and a phrase of interest.

Variations of such methods tend to suffer from low recall. This is because (i) words are commonly replaced by synonyms, and (ii) concepts can be articulated in many diverse ways. Therefore, a need is felt for finding semantically similar variations of phrases.

SUMMARY OF THE INVENTION

Neural network based approaches provide semantic distance metrics, enabling the system to quantify similarity with close and related words, e.g., where 'manager' is close to 'supervisor', but introduce different challenges and limitations.

Neural Network (NN) based approaches for detecting phrase similarity can be divided into two branches:

Cross-encoder: In such implementations, 2 phrases may be concatenated and fed as input to a pretrained NN model for binary classification. This technique is very computationally intensive, as it requires a forward pass for every pair of phrases that need to be determined for similarity. This approach is not suitable for use cases such as those of call centers, where a user may insert many phrases to seek, and the number of sentences in conversations may constantly grow, resulting in a prohibitively high numbers of possible combinations.

Bi-encoder: This method represents all phrases as an embedding vector of the same size produced by a pretrained model. Phrase similarity can then be calculated as cosine distance between the vectors. This technique is designed for phrases that are relatively similar in length, and does not extend trivially into searching within a long text such as conversations. A naïve and popular approach would include separating the text into sentences or similar units and then producing the embeddings, yet this does not yield satisfactory results in the domain of natural conversations, due to their characteristics of long, ill-formed sentences.

Additionally, bi-encoders derive embeddings from all words in the input sequence resulting in inability to capture higher resolution nuances. Simply put, the existence of irrelevant words in the input sequence demands lower thresholds for similarity, that in turn limits the ability to capture important differences.

For example, a phrase such as "I called you twice earlier" is semantically very different from "I'll call them later" in the context of call centers, yet a low threshold may hinder the ability to detect such differences efficiently even with domain finetuning.

Embodiments of the invention may provide high, token-level resolution of semantic representation such as that of a cross-encoder, without the high computational cost involved in running a 'forward pass' for all pair-wise comparisons required in the cross-encoder setting.

As explained herein, by producing vector embeddings for each n-gram or word, embodiments of the invention may calculate distance for vector embeddings between the search terms and the n-grams (e.g., words) in the text, thereby eliminating the need for a quadric amount of forward passes.

Additionally, embodiments of the invention may effectively find relevant phrases in large, dynamic textual representations, e.g., originating from call center conversations, without the need to define the topics or phrases in advance. This may be beneficial, for example, by allowing different contact centers to define unique phrases of interest, and update them at will with a higher degree of accuracy than any currently available method.

Embodiments of the invention may include a method of identifying occurrence of a semantic variation of a phrase in a passage by at least one processor.

According to some embodiments, the at least one processor may calculate a phrase embedding vector, representing a semantic meaning of the phrase based on a textual representation of the phrase; obtain a textual representation of the passage that includes a plurality of words; and extract, from the textual representation of the passage, at least one hierarchical set of nested sequences of words, where each sequence of a hierarchical set forms a subset of words of a subsequent sequence in the hierarchical set.

The at least one processor may subsequently calculate, for one or more (e.g., each) sequence, a corresponding sequence embedding vector, representing a semantic meaning of the sequence. For one or more sequence embedding vectors, the at least one processor may calculate a corresponding vector similarity value, representing similarity with the phrase embedding vector. The at least one processor may then identify a sequence corresponding to a maximal vector similarity value of the one or more vector similarity values, and determine the identified sequence as a semantic variation of the phrase, based on the maximal vector similarity value.

According to some embodiments, the at least one hierarchical set may include a plurality of hierarchical sets. The at least one processor may extract the plurality of hierarchical sets by selecting a plurality of kernel sequences, each including one or more words of the passage, and for each kernel sequence, producing a respective hierarchical set of nested sequences. Each nested sequence may include the kernel sequence and subsequent, monotonically increasing, nesting sequences of words.

According to some embodiments, the textual representation of the passage may include a transcript of a conversation. The at least one processor may select the kernel sequences by choosing a section of the transcript, associated with a specific speaker in the conversation; and selecting the kernel sequences to comprise one or more words of the chosen section.

Additionally, or alternatively, the at least one processor may select the kernel sequences by calculating, for one or more words of the passage, one or more respective labels representing parts of speech (POS); and selecting the kernel sequences to comprise one or more words of the passage based on the calculated POS labels.

Additionally, or alternatively, the at least one processor may select the kernel sequences by calculating, for one or more words of the passage, one or more respective metrics of term relevance; and selecting the kernel sequences to comprise one or more words of the passage based on the calculated metrics of term relevance.

According to some embodiments, the at least one processor may calculate a sequence embedding vector of a specific sequence by obtaining a machine-learning (ML) based model, pretrained to map between textual representations of words and corresponding word embedding vectors; inferring the ML based model on one or more words of the specific sequence, to produce one or more corresponding word embedding vectors, based on said training; and calculating the sequence embedding vector as a function of the one or more word embedding vectors.

The at least one processor may train the ML model by inferring the ML based model on a first word, to produce a first interim word embedding vector, representing a semantic meaning of the first word; inferring the ML based model on a second word, to produce a second interim word embedding vector, representing a semantic meaning of the second word; receiving a first annotation data element, representing semantic similarity between the first word and the second word; calculating a vector similarity value, representing similarity between the interim word embedding vectors; calculating a first loss function value, representing a difference between the vector similarity value and the semantic similarity, as represented by the first annotation data element; and training the ML model so as to minimize the first loss function value.

Additionally, or alternatively, the at least one processor may train the ML model by inferring the ML based model on a first sequence, to produce a first interim sequence embedding vector; inferring the ML based model on a second sequence, to produce a second interim sequence vector; receiving a second annotation data element, representing sequence semantic similarity between the first sequence and the second sequence; calculating a second vector similarity value, representing similarity between the interim sequence embedding vectors; calculating a second loss function value, representing a difference between the second vector similarity value and the sequence semantic similarity, as represented by the second annotation data element; and training the ML model so as to minimize the second loss function value.

Additionally, or alternatively, the at least one processor may train the ML model by receiving a textual representation of a phrase; receiving a passage annotation data element, indicating existence of a variation of the phrase in the passage; inferring the ML based model on a hierarchical set of sequences obtained from said passage, to calculate an interim maximal vector similarity value; and training the ML model such that a value of the interim maximal vector similarity value corresponds to occurrence of a variation of the phrase in the passage, as represented by the passage annotation. It may be appreciated that the passage annotation data element may be devoid of information indicating location of the variation of the phrase within the received passage.

Embodiments of the invention may include a system for identifying occurrence of a semantic variation of a phrase in a passage. Embodiments of the system may include: a non-transitory memory device, wherein modules of instruction code are stored, and at least one processor associated with the memory device, and configured to execute the modules of instruction code.

Upon execution of said modules of instruction code, the at least one processor may be configured to: based on a textual representation of the phrase, calculate a phrase embedding vector, representing a semantic meaning of the phrase; obtain a textual representation of the passage, may include a plurality of words; extract, from the textual representation of the passage, at least one hierarchical set of nested sequences of words, wherein each sequence of a hierarchical set forms a subset of words of a subsequent sequence in the hierarchical set; for each sequence, calculate a corresponding sequence embedding vector, representing a semantic meaning of the sequence; for one or more sequence embedding vectors, calculate a corresponding vector similarity value, representing similarity with the phrase embedding vector; identify a sequence corresponding to a maximal vector similarity value of the one or more vector similarity values; and determine the identified sequence as a semantic variation of the phrase, based on the maximal vector similarity value.

Embodiments of the invention may include a method of identifying occurrence of a semantic variation of a phrase in a passage by at least one processor. Embodiments of the method may include: based on a textual representation of the phrase, calculating a phrase embedding vector, representing a semantic meaning of the phrase; receiving a textual representation of the passage, may include a plurality of n-grams, extracting, from the textual representation of the passage, a plurality of sequences of n-grams; for each sequence, calculating a corresponding sequence embedding vector, representing a semantic meaning of the sequence; for one or more sequence embedding vectors, calculating a similarity with the phrase embedding vector; and determining the identified sequence as a semantic variation of the phrase, based on the calculated similarity.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 5 is a flow diagram, depicting a method of identifying a variation of a phrase in a textual passage, according to some embodiments of the invention.

Figure 1:
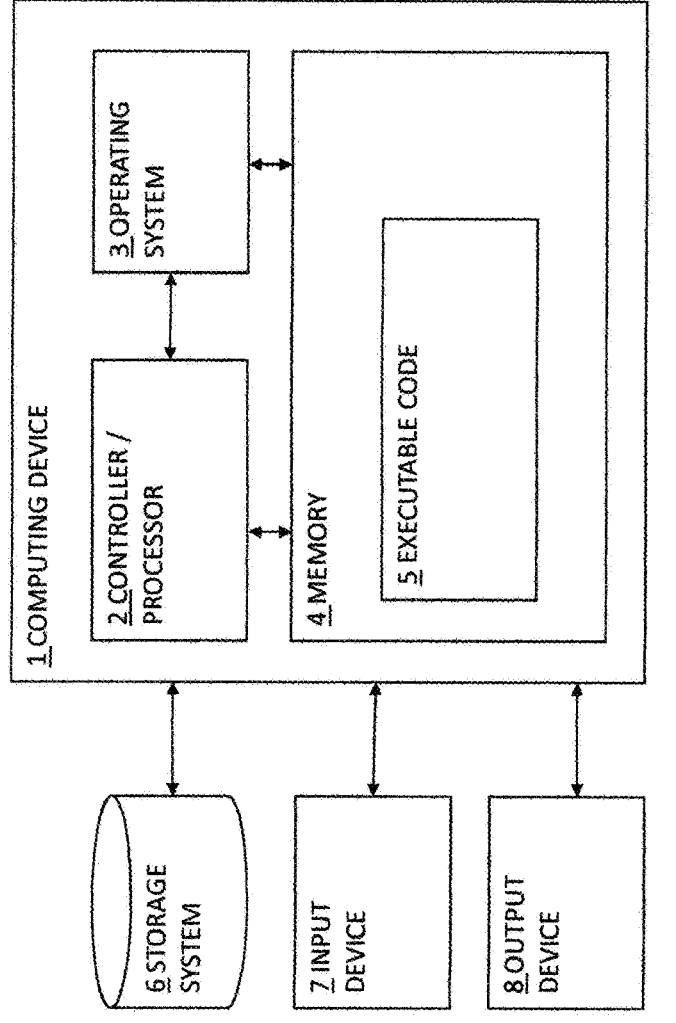
FIG. 1 is a block diagram, depicting a computing device which may be included in a system for identifying a variation of a phrase in a textual passage according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

Reference is now made to FIG. 1, which is a block diagram depicting a computing device, which may be included within an embodiment of a system for identifying a variation of a phrase in a textual passage, according to some embodiments.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task, or script. Executable code 5 may be executed by processor or controller 2 possibly under control of operating system 3. For example, executable code 5 may be an application that may identify a variation of a phrase in a textual passage as further described herein. Although, for the sake of clarity, a single item of executable code 5 is shown in FIG. 1, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Textual data may be stored in storage system 6 and may be loaded from storage system 6 into memory 4 where it may be processed by processor or controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components, or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

The term neural network (NN) or artificial neural network (ANN), e.g., a neural network implementing a machine learning (ML) or artificial intelligence (AI) function, may be used herein to refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. At least one processor (e.g., processor 2 of FIG. 1) such as one or more CPUs or graphics processing units (GPUs), or a dedicated hardware device may perform the relevant calculations.

Figure 2:
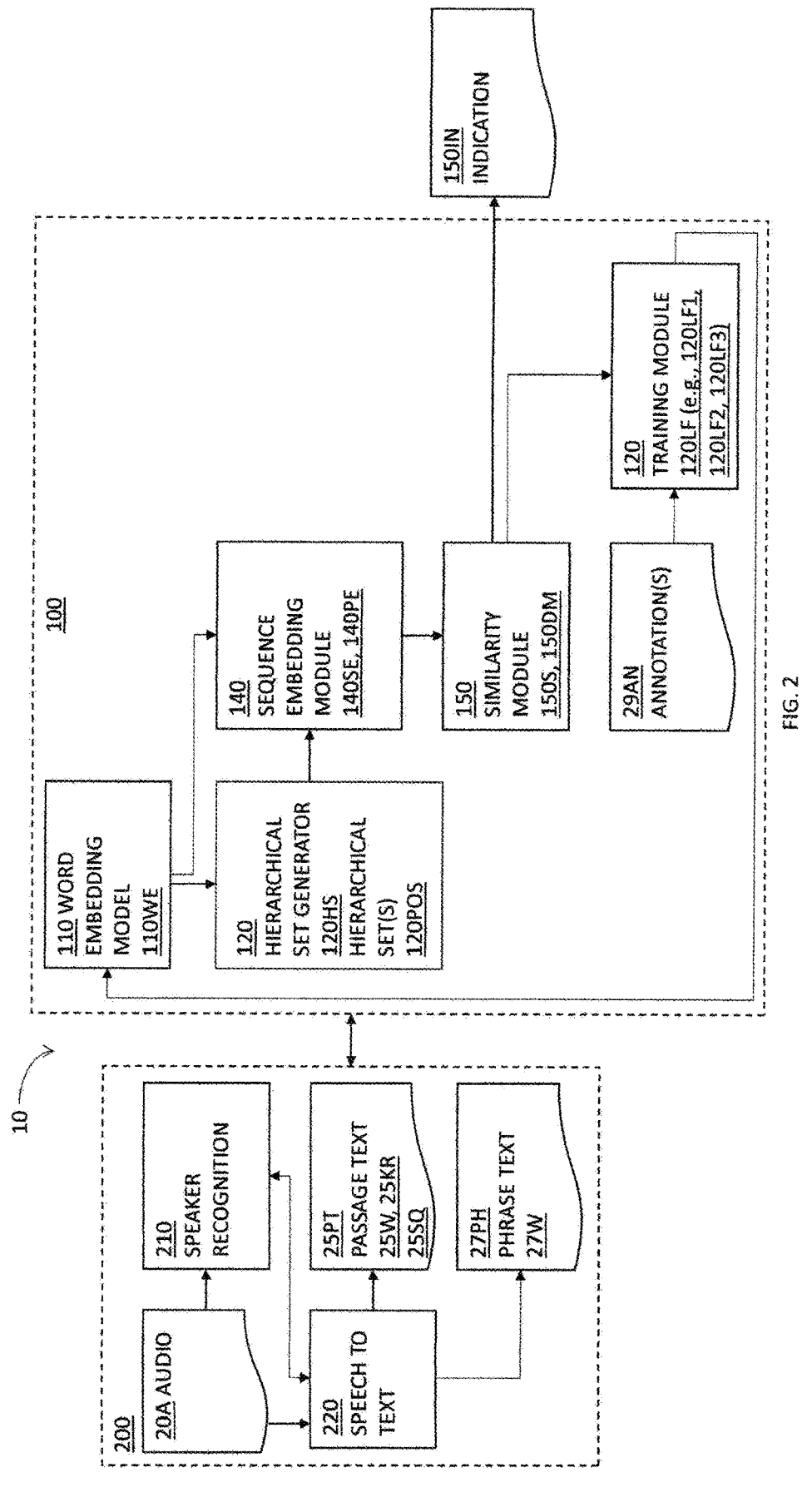
FIG. 2 is a block diagram, depicting a system for identifying a variation of a phrase in a textual passage, according to some embodiments of the invention.

Reference is now made to FIG. 2, which depicts a system 10 for identifying a variation of a phrase in a textual passage, according to some embodiments.

According to some embodiments of the invention, system 10 may be implemented as a software module, a hardware module, or any combination thereof. For example, system may be or may include a computing device such as element 1 of FIG. 1, and may be adapted to execute one or more modules of executable code (e.g., element 5 of FIG. 1) to identify a variation of a phrase in a textual passage, as further described herein.

As shown in FIG. 2, arrows may represent flow of one or more data elements to and from system 10 and/or among modules or elements of system 10. Some arrows have been omitted in FIG. 2 for the purpose of clarity.

As shown in the example of FIG. 2, system 10 may include a preprocessing module 200, and an analysis module 100.

Preprocessing module 200 may be configured to obtain textual information, such as a textual representation of a passage ("passage text 25PT") and a textual representation of a phrase ("phrase text 27PH"). to be analyzed so as to identify a variation of a phrase of interest in a textual passage. Analysis module 100 may receive textual information 25PT/27PH, from preprocessing module 200 and may in turn analyze textual information 25PT/27PH to identify, or ascertain appearance of a phrase of interest in the passage, as elaborated herein.

According to some embodiments, preprocessing module 200 may receive at least one of passage text 25PT and phrase text 27PH as input, e.g., via input device 7 of FIG. 1.

Additionally, or alternatively, preprocessing module 200 may receive information from a plurality of sources, in a variety of formats, and apply any logic to process this information into textual representation (e.g., passage text 25PT and phrase text 27PH).

For example, preprocessing module 200 may receive audio data 20A (e.g., an audio file, or streaming audio data) which includes human speech, e.g., via input device 7 of FIG. 1, and/or from storage 6 of FIG. 1. Preprocessing module 200 may employ a speech-to-text 220 process or module on the incoming audio data 20A, as known in the art, to obtain passage text 25PT and/or phrase text 27PH as a textual representation of the speech in audio data 20A.

As known in the art, word embedding vectors are numerical representations of words in a high-dimensional vector space. This representation is designed to capture the semantic meaning and relationships between words based on their context in a corpus of text. Word embeddings have become a fundamental tool in Natural Language Processing (NLP) and Machine Learning (ML) techniques because they enable algorithms to work with words as continuous vectors rather than discrete symbols. Words in a vocabulary are typically assigned unique, numerical word embedding vectors, chosen so that they encode semantic relationships between words, where similar words are represented as vectors that are close together in the vector space.

As shown in FIG. 2, system 10 may include an ML-based word embedding model 110 (or "model 110" for short), configured to map between a textual representation of a word, and a corresponding word embedding vector 110WE. The structure and configuration of model 110 is elaborated herein, e.g., in relation to FIGS. 3 and 4.

As shown in FIG. 2, system 10 may further include a sequence embedding module 140, configured to calculate an embedding vector of a sentence, or sequence of words, based on, or as a function of word embedding vectors 110WE of words that comprise that sequence.

For example sequence embedding module 140 may receive (i) the textual representation, phrase text 27PH, of a phrase of interest, and (ii) word embedding vectors 110WE of words 27W in phrase text 27PH, and calculate a phrase embedding vector 140PE representing a semantic meaning of the phrase, based on (i) and (ii). For example, phrase embedding vector 140PE may be a point-average vector, where each entry of the vector is an average of respective entries in word embedding vectors 110WE of one or more (e.g., all) words 27W in phrase text 27PH.

As shown in FIG. 2, system 10 may include a hierarchical set generation module 120 (or hierarchical module 120, for short). According to some embodiments, hierarchical module 120 may be configured to obtaining a textual representation 25PT of a passage of interest comprised of a plurality of words 25W, and extract from textual representation 25PT at least one hierarchical set 120HS of nested sequences 25SQ of words 25W.

The term "nested" may be used herein in a sense that (a) each hierarchical set 120HS may originate from a kernel sequence 25KR of one or more words 25W, and (b) each sequence 25SQ of a hierarchical set may form a subset of words 25W of a subsequent sequence in the hierarchical set 120HS.

For example, a textual representation 25PT of the sentence "I like cold pizzas" may be used to produce a first hierarchical set 120HS of sequences 25SQ such as: {"I"; "I like"; "I like cold"; "I like cold pizzas"}, where "I" is the kernel sequence 25KR.

In another example, "cold pizzas" may be used as a kernel sequence 25KR, to produce a second hierarchical set 120HS of sequences 25SQ such as: {"cold pizzas"; "like cold pizzas"; "I like cold pizzas"}.

According to some embodiments, hierarchical set generation module 120 may produce a plurality of hierarchical sets 120HS.

For example, hierarchical set generation module 120 may be configured with a minimal sequence size, defining a minimal number of words 25W or n-grams in a sequence 25SQ (e.g., '1'), and a maximal sequence size, defining a maximal number of words 25W or n-grams in a sequence 25SQ (e.g., equal to the length of passage text 25PT). Hierarchical set generation module 120 may produce an exhaustive combination of hierarchical sets, which may include all possible combinations of nested sequences 25SQ between the minimal sequence size and maximal sequence size.

Additionally, or alternatively, hierarchical set generation module 120 may select a plurality of kernel sequences 25KR, each including one or more words 25W (or tokens, n-grams, etc.) 25W of passage 25PT, e.g., as defined by the minimal number of words 25W or n-grams in a sequence 25SQ. For one or more (e.g., each) kernel sequence, hierarchical set generation module 120 may produce a respective hierarchical set 120HS of nested sequences. Each hierarchical set 120HS may include the respective kernel sequence, and subsequent, monotonically increasing, nesting sequences 25SQ of words 25W.

According to some embodiments, audio data 20A may include a conversation between one or more speakers, such as a conversation between an agent and a client in a call center. Speech-to-text 220 module may produce a textual representation 25PT that is a transcript of the conversation. Additionally, speech-to-text module 220 may collaborate with a speaker recognition module, adapted to associate portions of the conversation with one or more specific speakers, as known in the art.

System 10 may select a section of the transcript that is associated with a specific speaker of interest in the conversation, and may limit selection of at least one kernel sequence 25KR to the selected section of that speaker.

In other words, to minimize the span of searchable content within passage text 25PT, preprocessing module 200 may divide the conversation into different searchable sections, marking the divisions by indications of speaker change and/or elapse of minimal silence time (e.g., 1 second). System 10 may then differentiate between utterances of different speakers (e.g., agents and clients), and limit the search for variations of phrase 27PH to sections of a speaker of interest. System 10 may thereby eliminate the need to search over text that spans over, or overlaps more than one section (e.g., speaker) in passage text 25PT.

In such embodiments, hierarchical set generation module 120 may select kernel sequences 25KR to include one or more words 25W of the selected section, e.g., of the speaker of interest. Additionally, or alternatively, hierarchical set generation module 120 may produce the set of nested, hierarchical sets 120HS to only include sequences of words 25W of the selected section, e.g., of the speaker of interest.

According to some embodiments, for one or more (e.g., each) sequence 25SQ of the hierarchical sets 120HS sequence embedding module 140 may calculate a corresponding sequence embedding vector 140SE, representing a semantic meaning of the sequence, based on the embedding vectors 110WE words 25W in that sequence 25SQ.

For example, sequence embedding vector 140SE may be a point-average vector, where each entry of the vector is an average of respective entries in word embedding vectors 110WE of the sequence 25SQ.

As shown in FIG. 2, system 10 may include a similarity calculation module 150, configured to calculate similarity 150S between embedding vectors, based on a predefined distance metric 150DM.

According to some embodiments, for one or more (e.g., all) sequence embedding vectors 140SE, similarity calculation module 150 may calculate a corresponding vector similarity value 150S, representing a respective similarity with phrase embedding vector 140PE.

For example, distance metric 150DM may include a cosine distance metric, and similarity value 150S may be a numeric value which defines similarity of one or more (e.g., all) sequence embedding vectors 140SE to embedding phrase embedding vector 140PE. In such embodiments, a high similarity value 150S may represent high semantic similarity between a specific phrase 27PH (represented by a phrase embedding vector 140PE) and a specific sequence 25SQ of words 25W (represented by a specific sequence embedding vector 140SE).

Similarity calculation module 150 may subsequently identify a specific sequence 25SQ that corresponds to a maximal vector similarity value 150S of the one or more vector similarity values. In other words, similarity calculation module 150 may find the sequence 25SQ which is most semantically similar to the phrase 27PH of interest.

System 10 may proceed to determine whether the identified sequence 25SQ is a semantic variation of phrase 27PH, based on the maximal vector similarity value.

For example, when the maximal vector similarity value 150S, corresponding to a specific sequence 25SQ of words 25W, surpasses a predefined threshold, then system 10 may produce an indication data element 150IN. Indication data element 150IN may include a notification that identifies the specific sequence 25SQ of words 25W (which is included in passage text 25PT) as either identical to, or as a semantic variation of phrase of interest 27PH.

Figure 3:
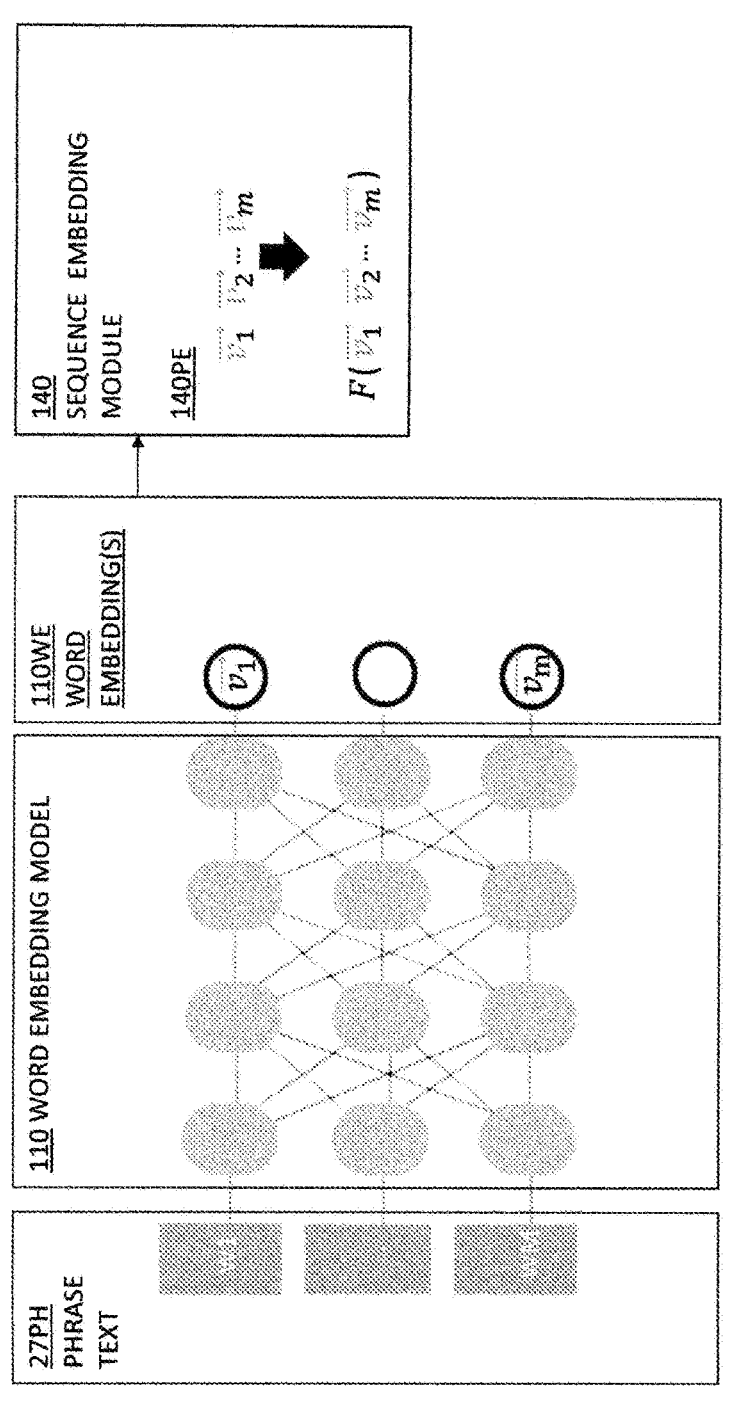
FIG. 3 is a schematic diagram, depicting a process of calculating an embedding vector, according to some embodiments of the invention.

Reference is now made to FIG. 3, which is a schematic diagram, depicting a process of calculating an embedding vector, according to some embodiments of the invention. Modules depicted in FIG. 3 may be the same as respectively numbered modules of FIG. 2.

Figure 4:
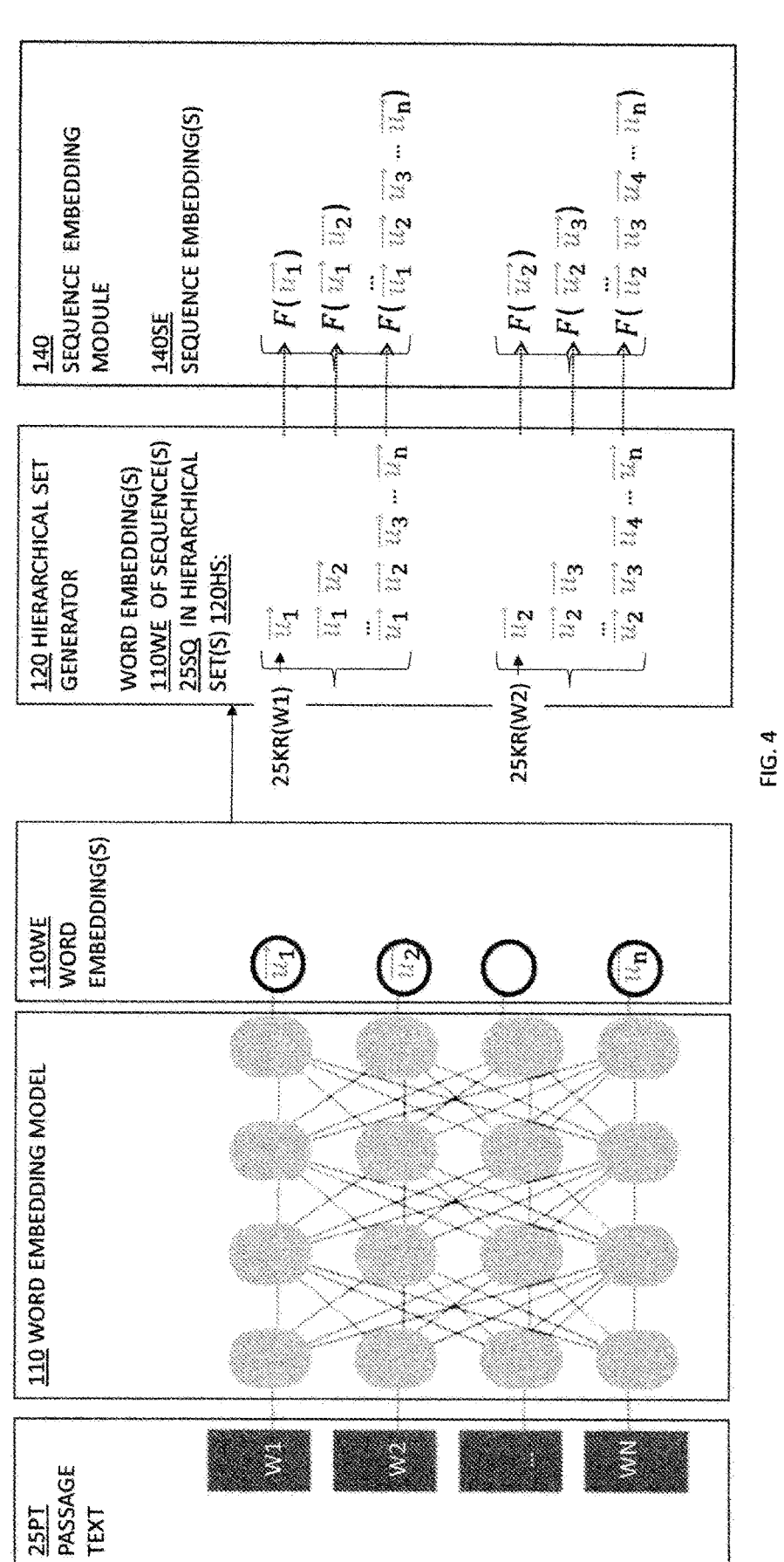
FIG. 4 is a schematic diagram, depicting a process of calculating sequence embedding vectors for hierarchical sets of nested sequences of words, according to some embodiments of the invention.

Reference also made to FIG. 4, which is a schematic diagram, depicting a process of calculating sequence embedding vectors for hierarchical sets of nested sequences of words 25W, according to some embodiments of the invention. Modules depicted in FIG. 4 may be the same as respectively numbered modules of FIGS. 2 and 3.

As shown in the example of FIG. 3, word embedding model 110 may be, or may include a ML based model 110, such as a NN model 110. ML model 110 may be pretrained to map between textual representations of words 25W/27W, such as phrase text 27PH and corresponding word embedding vectors, according to equation Eq. 1, below:

$$W(<w_1, w_2, \ldots, w_m>) = <\vec{v_1}, \vec{v_2}, \ldots, \vec{v_m}>$$
Eq. 1 where $<w_1, w_2, \ldots, w_m>$ is an input sequence (25SQ/27PH) of 'm' words or tokens, $<\vec{v_1}, \vec{v_2}, \ldots, \vec{v_m}>$ is a corresponding set of 'm' word embeddings 110WE, and W is a differentiable ML based function 110 that may produce contextualized embeddings 110WE for each token $w_i$ in the input sequence (25SQ/27PH).

According to some embodiments, and as shown in FIG. 3, system 10 may infer ML based model 110 on one or more words 27W $<w_1, w_2, \ldots, w_m>$ of a specific phrase text 27PH. ML based model 110 may thus produce one or more corresponding word embedding vectors 110WE $<\vec{v_1}, \vec{v_2}, \ldots, \vec{v_m}>$, based on the training.

Sequence embedding module 140 may subsequently calculate a phrase embedding vector 140PE as a function (denoted as F(·), e.g., a pointwise average) of the one or more word embedding vectors 110WE $<\vec{v_1}, \vec{v_2}, \ldots, \vec{v_m}>$.

According to some embodiments, and as shown in FIG. 4, system 10 may infer ML based model 110 on one or more words 25W $<w_1, w_2, \ldots, w_n>$ of at least one sequence 25SQ. ML based model 110 may thus produce one or more corresponding word embedding vectors 110WE $<\vec{u_1}, \vec{u_2}, \ldots, \vec{u_n}>$, based on the training.

As known in the art of Natural Language Processing (NLP), part-of-speech (POS) tags are labels assigned to individual words or tokens in a text to indicate their grammatical category or syntactic role within a sentence. This includes syntactic markers such as verbs, adjectives, adverbs, pronouns, prepositions, conjunctions, and the like.

According to some embodiments, hierarchical set generation module 120 may calculate, for one or more words 25W or tokens in passage text 25PT, corresponding POS labels 120POS, as known in the art.

Hierarchical set generation module 120 may subsequently select kernel sequences 25KR, each including one or more words 25W of passage 25PT based on the calculated 120POS labels. For example, hierarchical set generation module 120 may select kernel sequences 25KR that include, or represent predetermined semantic roles or POSs, such as verb phrases, as indicated by POS labels 120POS.

Additionally, or alternatively, hierarchical set generation module 120 may select kernel sequences 25KR that pertain to a specific speaker, a specific section in text 25PT, or other metrics of term relevance, such as TF/IDF, so that kernel sequences 25KR are selected as the most relevant words 25W, or combination of words 25W in text 25PT.

In the non-limiting example of FIG. 4, the selected kernel sequences 25KR are W1 and W2, which correspond to word embedding vectors $\vec{u_1}, \vec{u_2}$ respectively.

As elaborated herein, hierarchical set generation module 120 may use the selected kernel sequences 25KR to produce respective hierarchical set 120HS of nested sequences.

FIG. 4 provides examples for word embeddings 110WE of two hierarchical sets 120HS: One originates from $\vec{u_1}$ (embedding of $W_1$) and culminates at $\vec{u_1}, \vec{u_2}, \ldots, \vec{u_n}$. Another originates from $\vec{u_2}$ (embedding of $W_2$) and also culminates at $\vec{u_1}, \vec{u_2}, \ldots, \vec{u_n}$.

As shown in FIG. 4, Sequence embedding module 140 may produce sequence embedding vectors 140SE for one or more (e.g., each) sequence 25SQ in one or more (e.g., each) hierarchical set 120HS.

Sequence embedding module 140 may subsequently calculate sequence embedding vector(s) 140SE as a function (denoted as F(·), e.g., a pointwise average) of the one or more word embedding vectors $<\vec{u_1}, \vec{u_2}, \ldots, \vec{u_n}>$ of each word sequence 25SQ.

According to some embodiments, system 10 may include a training module 120, adapted to train ML-based word embedding model 110 (also referred to herein as NN model 110) to map between words (e.g., 25W, 27W) and corresponding word embedding vectors 110WE.

It may be appreciated that training module 120 may train ML model 110 in an initial training stage, where weights of an NN model 110 may be adapted based on an annotated 29AN training dataset. The training stage may be followed by an inference stage, where ML based model 110 may be applied to, or inferred on target phrase 27PH and/or passage text 25PT of interest.

Additionally, or alternatively, training module 120 may train ML model 110 repeatedly (e.g., continuously, over time) as new annotated examples of annotated data is presented to system 10.

According to some embodiments, training module 120 may train ML model 110 incrementally, based on calculated values of one or more loss functions 120LF, as elaborated herein.

For example, system 10 may infer ML based model 110 on a first word (e.g., included in passage text 25PT), to produce a first interim word embedding vector 110WE, representing a semantic meaning of the first word. System 10 may also infer ML based model 110 on a second word (e.g., also included in passage text 25PT), to produce a second interim word embedding vector 110WE that represents a semantic meaning of the second word.

The term "interim" may be used herein in a sense that during training, embedding vectors 110WE may have temporary, inaccurate values that may be gradually adapted or refined as part of the training process to better represent the underlying words of interest.

According to some embodiments, training module 120 may then receive (e.g., via input device 7 of FIG. 1) a first annotation data element 29AN. Annotation data element 29AN may represent, or indicate semantic similarity between the first word and the second word. For example, annotation data element 29AN may be a numerical value between [0, 1], where a low value (e.g., 0.1) represents low semantic similarity between the first word and second word (e.g., "dog", "hat"), and a high value (e.g., 0.9) represents high semantic similarity between the first word and second word (e.g., "dog", "hound").

According to some embodiments, similarity module 150 may calculate a vector similarity value 150S (e.g., an inverse of cosine distance) that may represent similarity between the interim word embedding vector 110WE of the first word and the interim word embedding vector 110WE of the second word.

Training module 120 may calculate a first numerical loss function value 120LF (denoted 120LF1), representing a difference between the vector similarity value 150S and the semantic similarity, as represented by the first annotation data element 29AN.

For example, loss function value 120LF (120LF1) may be in the range of [0, 1], where a large numerical value (e.g., 0.9) represents a large difference between vector similarity value 150S and annotation data element 29AN, and where a small numerical value (e.g., 0.1) represents a small difference between vector similarity value 150S and annotation data element 29AN.

Training module 120 may then train ML model 110 so as to minimize loss function value 120LF (120LF1).

In other words, training module 120 may utilize annotation data element 29AN as supervisory information to train ML model 110. For example, training module 120 may train ML model 110 by applying a back-propagation algorithm as known in the art, to adjust weights of NN 110 thereby decreasing the difference between similarity value 150S and annotation data element 29AN, and minimizing loss function value 120LF (120LF1).

Additionally, or alternatively, training module 120 may train ML model 110 based on sequence embedding vectors.

For example, training module 120 may infer the ML based model 110 on a first sequence 25SQ (e.g., of passage text 25PT), to produce a first interim sequence embedding vector 140SE, and infer ML based model 110 on a second sequence 25SQ to produce a second interim sequence vector 140SE. Training module 120 may receive a second annotation data element 29AN representing sequence semantic similarity between the first sequence 25SQ and the second sequence 25SQ. For example, annotation data element 29AN may be a numerical value between [0, 1], where a low value (e.g., 0.1) represents low semantic similarity between the first sequence 25SQ and second sequence 25SQ (e.g., "I love cake", "dog chases cat"), and a high value (e.g., 0.9) represents high semantic similarity between the first sequence 25SQ and second sequence 25SQ (e.g., "I love cake", "I enjoy cookies").

According to some embodiments, similarity module 150 may calculate a second vector similarity value 150S (e.g., an inverse of cosine distance) that may represent similarity between the interim sequence embedding vectors 140SE of the first sequence 25SQ and the second sequence 25SQ.

Training module 120 may calculate a second loss function value 120LF (denoted 120LF2), representing a difference between the second vector similarity value 150S and the sequence semantic similarity, as represented by the second annotation data element 29AN. For example, loss function value 120LF (120LF2) may be in the range of [0, 1], where a large numerical value (e.g., 0.9) represents a large difference between vector similarity value 150S and annotation data element 29AN, and where a small numerical value (e.g., 0.1) represents a small difference between vector similarity value 150S and annotation data element 29AN.

Training module 120 may then train ML model 110 so as to minimize the second loss function value 120LF (120LF2).

In other words, training module 120 may utilize annotation data element 29AN as supervisory information to train ML model 110. For example, training module 120 may train ML model 110 by applying a back-propagation algorithm as known in the art, to adjust weights of NN 110, thereby decreasing the difference between similarity value 150S and annotation data element 29AN, and minimizing loss function value 120LF (120LF2).

Additionally, or alternatively, training module 120 may train ML model 110 based on annotated passages 25PT. In such embodiments, annotation data 29AN may be, or may include an indication (e.g., 0/1), defining existence or absence of a phrase 27PH (either as an exact copy or as a semantically equivalent version thereof) in a passage 25PT of interest.

It may be appreciated that by representing text 25PT as embeddings 140SE of hierarchical nested sequences 120HS, system 10 may simplify training, and improve inference of model 110: Unlike currently available methods of extracting phrases and topics of interest in a given text, system 10 will not require definition of a location or a frame where a variation of the phrase of interest should be sought. In that sense, production of hierarchical nested sequences 120HS may be intuitively seen as facilitating a search of a relevant frame within text 25PT, that will encompass the semantic meaning of the topic, or phrase of interest.

Therefore, passage annotation data element 29AN may be devoid of any information indicating a location of the variation of the phrase of interest 27PH within passage 25PT.

As elaborated herein, system 10 may obtain from passage 25PT at least one hierarchical set 120HS of sequences. According to some embodiments, training module 120 may infer ML based model 110 on the hierarchical set 120HS of sequences (e.g., one sequence at a time), to calculate, or find an interim maximal vector similarity value 150S. As explained herein, the interim maximal vector similarity value 150S may correspond to a sequence 25SQ (in hierarchical set 120HS) that is most semantically similar to phrase 27PH, at that point in the training process.

Training module 120 may then train ML model 110 such that the interim maximal vector similarity value corresponds to, or represents occurrence of the phrase of interest 27PH or a semantic variation thereof in passage 25PT, as represented by the passage annotation 29AN.

In other words, training module 120 may utilize annotation data element 29AN as supervisory information to train ML model 110. For example, training module 120 may train ML model 110 by applying a back-propagation algorithm as known in the art, to adjust weights of NN 110, and thereby adjust similarity value 150S to predict existence or inexistence of phrase 27PH (or a semantic variant thereof) in passage text 25PT, as indicated by annotation data element 29AN.

Reference is now made to FIG. 5, which is a flow diagram depicting a method of identifying a variation of a phrase in a textual passage by at least one processor (e.g., processor 2 of FIG. 1), according to some embodiments of the invention.

As shown in step S1005, the at least one processor 2 may receive (e.g., via input 7 of FIG. 1) or obtain a textual representation (e.g., 27PH of FIG. 2) of the phrase of interest. Based on 27PH, the at least one processor 2 may calculate a phrase embedding vector (e.g., 140PE of FIG. 2), representing a semantic meaning of the phrase 27PH, as explained herein.

As shown in step S1010, the at least one processor 2 may obtain, or receive (e.g., via input 7 of FIG. 1) a textual representation of the passage (e.g., 25PT of FIG. 2), that may include a plurality of words 25W, tokens or n-grams.

As shown in step S1015, the at least one processor 2 may extract, from textual representation of the passage 25PT, at least one hierarchical set (e.g., 120HS of FIGS. 2, 3) of nested sequences (e.g., 25SQ of FIGS. 2, 4) of words 25W (or tokens or n-grams), where one or more (e.g., each) sequence of a hierarchical set 120HS may form a subset of words 25W of a subsequent sequence 25SQ in the hierarchical set.

As shown in step S1020, for each sequence 25SQ, the at least one processor 2 may calculate a corresponding sequence embedding vector (e.g., 140SE of FIGS. 2, 4), representing a semantic meaning of the respective sequence 25SQ.

As shown in step S1025, for one or more sequence embedding vectors, the at least one processor 2 may calculate a corresponding vector similarity value (e.g., 150S of FIG. 2), representing similarity of the respective sequence embedding vectors 140SE with the phrase embedding vector 140PE.

As shown in steps S1030 and S1035, the at least one processor 2 may identify a sequence 25SQ corresponding to a maximal vector similarity value 150S of the one or more vector similarity values, and subsequently determine the identified sequence 25SQ as a semantic variation of the phrase 27PH, based on the maximal vector similarity value 150S, e.g., when the maximal vector similarity value 150S surpasses a predetermined threshold.

As elaborated herein, embodiments of the invention may provide a practical application for determining a variation of a phrase or topic in a passage, such as a transcript of a spoken conversation (e.g., in a call center).

The current invention may provide an improvement in the technological field of automated language processing: As explained above, due to a novel structuring of semantic data (e.g., embeddings of hierarchical sets 120HS), embodiments of the invention may iteratively, and robustly find portions, or segments of the passage that best correspond semantically to the topic or phrase of interest. This finding may not be confined to any restrictions, definitions or frames in the examined passage, as required by currently available methods of natural language processing.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of identifying occurrence of a semantic variation of a phrase in a passage by at least one processor, the method comprising:

based on a textual representation of the phrase, calculating a phrase embedding vector, representing a semantic meaning of the phrase;

obtaining a textual representation of the passage, comprising a plurality of words;

extracting, from the textual representation of the passage, at least one hierarchical set of nested sequences of words, wherein each sequence of a hierarchical set forms a subset of words of a subsequent sequence in the hierarchical set;

for each of the at least one hierarchical set of nested sequences, calculating a corresponding sequence embedding vector, representing a semantic meaning of the hierarchical set of nested sequences;

for one or more sequence embedding vectors, calculating a corresponding vector similarity value, representing similarity with the phrase embedding vector;

identifying a sequence corresponding to a maximal vector similarity value of the one or more vector similarity values; and determining the identified sequence as a semantic variation of the phrase, based on the maximal vector similarity value.

2. The method of claim 1, wherein the at least one hierarchical set comprises a plurality of hierarchical sets.

3. The method of claim 2, wherein extracting the plurality of hierarchical sets comprises:

selecting a plurality of kernel sequences, each comprising one or more words of the passage; and for each kernel sequence, producing a respective hierarchical set of nested sequences, each comprising the kernel sequence and subsequent, monotonically increasing, nesting sequences of words.

4. The method of claim 3, wherein the textual representation of the passage is a transcript of a conversation, and wherein selecting the plurality of kernel sequences comprises:

selecting a section of the transcript, associated with a specific speaker in the conversation; and selecting the plurality of kernel sequences to comprise one or more words of the selected section.

5. The method of claim 3, wherein selecting the plurality of kernel sequences comprises:

calculating, for one or more words of the passage, one or more respective labels representing parts of speech (POS); and selecting the plurality of kernel sequences to comprise one or more words of the passage based on the calculated one or more respective labels representing POS.

6. The method of claim 3, wherein selecting the plurality of kernel sequences comprises:

calculating, for one or more words of the passage, one or more respective metrics of term relevance; and selecting the plurality of kernel sequences to comprise one or more words of the passage based on the calculated one or more respective metrics of term relevance.

7. The method of claim 1, wherein calculating a corresponding sequence embedding vector of a specific sequence comprises:

obtaining a machine-learning (ML) based model, pre-trained to map between textual representations of words and corresponding word embedding vectors;

inferring the ML based model on one or more words of the specific sequence, to produce one or more corresponding word embedding vectors, based on said pre-training; and

calculating the corresponding sequence embedding vector of the specific sequence as a function of the one or more corresponding word embedding vectors.

8. The method of claim 7, wherein training of the obtained ML based model comprises:

inferring the ML based model on a first word, to produce a first interim word embedding vector, representing a semantic meaning of the first word;

inferring the ML based model on a second word, to produce a second interim word embedding vector, representing a semantic meaning of the second word;

receiving a first annotation data element, representing semantic similarity between the first word and the second word;

calculating a vector similarity value, representing similarity between the first interim word embedding vector and the second interim word embedding vector;

calculating a first loss function value, representing a difference between the vector similarity value and the semantic similarity, as represented by the first annotation data element; and training the ML based model so as to minimize the first loss function value.

9. The method of claim 7, wherein training of the obtained ML based model comprises:

inferring the ML based model on a first sequence, to produce a first interim sequence embedding vector;

inferring the ML based model on a second sequence, to produce a second interim sequence embedding vector;

receiving a second annotation data element, representing sequence semantic similarity between the first sequence and the second sequence;

calculating a second vector similarity value, representing similarity between the first interim sequence embedding vector and the second interim sequence embedding vector;

calculating a second loss function value, representing a difference between the second vector similarity value and the sequence semantic similarity, as represented by the second annotation data element; and training the ML based model so as to minimize the second loss function value.

10. The method of claim 7, wherein training of the obtained ML based model further comprises:

receiving a textual representation of the phrase;

receiving a passage annotation data element, indicating existence of a variation of the phrase in the passage;

inferring the ML based model on a hierarchical set of sequences obtained from said passage, to calculate an interim maximal vector similarity value; and training the ML based model such that a value of the interim maximal vector similarity value corresponds to occurrence of a variation of the phrase in the passage, as represented by the passage annotation data element.

11. The method of claim 10, wherein the passage annotation data element is devoid of information indicating a location of the occurrence of the variation of the phrase in the passage.

12. A system for identifying occurrence of a semantic variation of a phrase in a passage, the system comprising: a non-transitory memory device, wherein modules of instruction code are stored, and at least one processor associated with the memory device, and configured to execute the modules of instruction code, whereupon execution of said modules of instruction code, the at least one processor is configured to:

based on a textual representation of the phrase, calculate a phrase embedding vector, representing a semantic meaning of the phrase;

obtain a textual representation of the passage, comprising a plurality of words;

extract, from the textual representation of the passage, at least one hierarchical set of nested sequences of words, wherein each sequence of a hierarchical set forms a subset of words of a subsequent sequence in the hierarchical set;

for each of the at least one hierarchical set of nested sequences, calculate a corresponding sequence embedding vector, representing a semantic meaning of the hierarchical set of nested sequences;

for one or more sequence embedding vectors, calculate a corresponding vector similarity value, representing similarity with the phrase embedding vector;

identify a sequence corresponding to a maximal vector similarity value of the one or more vector similarity values; and determine the identified sequence as a semantic variation of the phrase, based on the maximal vector similarity value.

13. The system of claim 12, wherein the at least one hierarchical set comprises a plurality of hierarchical sets.

14. The system of claim 13, wherein the at least one processor is further configured to extract the plurality of hierarchical sets by:

selecting a plurality of kernel sequences, each comprising one or more words of the passage; and for each kernel sequence, producing a respective hierarchical set of nested sequences, each comprising the kernel sequence and subsequent, monotonically increasing, nesting sequences of words.

15. The system of claim 14, wherein the textual representation of the passage is a transcript of a conversation, and wherein the at least one processor is further configured to select the plurality of kernel sequences by:

selecting a section of the transcript, associated with a specific speaker in the conversation; and selecting the plurality of kernel sequences to comprise one or more words of the selected section.

16. The system of claim 14, wherein the at least one processor is further configured to select the plurality of kernel sequences by:

calculating, for one or more words of the passage, one or more respective labels representing parts of speech (POS); and selecting the plurality of kernel sequences to comprise one or more words of the passage based on the calculated one or more respective labels representing POS.

17. The system of claim 14, wherein the at least one processor is further configured to select the plurality of kernel sequences by:

calculating, for one or more words of the passage, one or more respective metrics of term relevance; and selecting the plurality of kernel sequences to comprise one or more words of the passage based on the calculated one or more respective metrics of term relevance.

18. The system of claim 12, wherein the at least one processor is further configured to calculate a corresponding sequence embedding vector of a specific sequence by:

obtaining a machine-learning (ML) based model, pre-trained to map between textual representations of words and corresponding word embedding vectors;

inferring the ML based model on one or more words of the specific sequence, to produce one or more corresponding word embedding vectors, based on said pre-training; and calculating the corresponding sequence embedding vector of the specific sequence as a function of the one or more corresponding word embedding vectors.

19. The system of claim 18, wherein the at least one processor is further configured to train the obtained ML based model further by:

receiving a textual representation of the phrase;

receiving a passage annotation data element, indicating existence of a variation of the phrase in the passage;

inferring the ML based model on a hierarchical set of sequences obtained from said passage, to calculate an interim maximal vector similarity value; and training the ML based model such that a value of the interim maximal vector similarity value corresponds to occurrence of a variation of the phrase in the passage, as represented by the passage annotation data element.

20. A method of identifying occurrence of a semantic variation of a phrase in a passage by at least one processor, the method comprising:

based on a textual representation of the phrase, calculating a phrase embedding vector, representing a semantic meaning of the phrase;

receiving a textual representation of the passage, comprising a plurality of n-grams, extracting, from the textual representation of the passage, a plurality of sequences of n-grams;

for each sequence, calculating a corresponding sequence embedding vector, representing a semantic meaning of the sequence;

for one or more sequence embedding vectors, calculating a similarity with the phrase embedding vector; and determining an identified sequence as a semantic variation of the phrase, based on the one or more calculated similarities.

\* \* \* \* \*